(No Model.)
G. B. JACKSON.
Carriage Axle Nut.
No. 236,228. Patented Jan. 4, 1881.
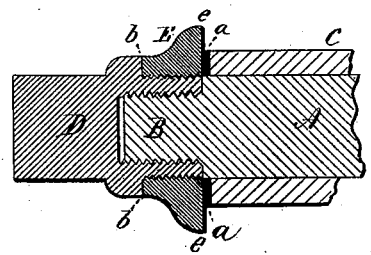
Witnesses.
J. H. Shumway
L. D. Rogers
George B. Jackson
Inventor
By atty
John F. Earle

UNITED STATES PATENT OFFICE.

GEORGE B. JACKSON, OF PLANTSVILLE, CONNECTICUT, ASSIGNOR OF ONE-HALF TO JOHN H. SWIFT, OF SAME PLACE.

CARRIAGE-AXLE NUT.

SPECIFICATION forming part of Letters Patent No. 236,228, dated January 4, 1881.

Application filed September 20, 1880. (No model.)

*To all whom it may concern:*

Be it known that I, GEORGE B. JACKSON, of Plantsville, in the county of Hartford and State of Connecticut, have invented a new Carriage-Axle Nut; and I do hereby declare the following, when taken in connection with the accompanying drawing and the letters of reference marked thereon, to be a full, clear, and exact description of the same, and which said drawing constitutes part of this specification, and represents a longitudinal section.

This invention relates to an improvement in the nuts used upon carriage-axles to secure the wheel upon the axle-arm, and commonly called "axle-nuts." In the usual construction these nuts are made to take a bearing hard against the shoulder on the axle-arm, and a washer of leather is introduced between the nut and the end of the axle-box. This washer wears away to a greater or less extent, and the wheel becomes so free as to play longitudinally upon the axle and cause an unpleasant rattling or thumping of the wheels. To obviate this difficulty new washers are introduced to fill the space occasioned by the wear of the washers or the wear of the ends of the box, and generally it is inconvenient for the user of the carriage to so renew the washers.

The object of this invention is to overcome this difficulty; and it consists in the construction of the nut, as hereinafter described, and particularly recited in the claim.

A is the axle-arm, provided with a threaded stud, B, at its end, in the usual manner; and C, the usual axle-box; *a*, the usual washer, introduced between the end of the axle-box and the nut.

The nut D is constructed to form a head at the outer end, upon which to apply the wrench, and at the inner end is tapped to pass onto the stud B of the axle and against the shoulder, in the usual manner.

At the inner end the nut is made cylindrical upon its outside, and onto this is placed a collar, E, having a flange, *e*, which corresponds to the usual flange of a carriage-nut, but so as to fit closely onto the cylindrical part of the nut, and preferably so as to set against an annular shoulder, *b*, on the nut in front of the collar, as shown in the drawing. Preferably the cylindrical part of the nut and the interior of the collar E are correspondingly screw-threaded. The two parts set together form the nut, which is applied in the usual manner.

In case of the wear of the washer or box the collar E is moved on the nut toward the box sufficient to take up the wear of the washers. This movement of the collar is made by simply unscrewing it from its position on the nut.

Instead of screw-threading the nut and collar E, the collar may be made to simply slide onto the nut, and then set up by the introduction of any suitable material between the outer end of the collar and the shoulder *b*.

By this construction the relation of the nut to the axle is never changed. It takes the same firm bearing against the rigid shoulder on the axle-arm, thereby overcoming insurmountable difficulties existing in previous efforts to adjust the nut.

I claim—

The axle-nut constructed to form a head at its outer end and tapped at its inner end to screw onto the stud of the axle, the outside at the inner end made cylindrical, combined with the collar E, adjustable on the said nut, substantially in the manner described.

GEORGE B. JACKSON.

Witnesses:
JOHN W. PARDEE,
WILLIAM C. UPSON.